3,352,944
BLEND OF BUTADIENE-STYRENE BLOCK COPOLYMER WITH CIS-POLYBUTADIENE
Robert C. Wheat, Bartlesville, Okla., assignor to Phillips Petroleum Company, a corporation of Delaware
No Drawing. Filed Jan. 3, 1964, Ser. No. 335,652
1 Claim. (Cl. 260—876)

This invention relates to elastomeric compositions. In another aspect, this invention relates to an elastomeric composition produced by blending solution-polymerized block butadiene-styrene rubber with other rubber compositions.

Within recent years, various elastomeric compositions suitable for the manufacture of vehicle tires and other finished articles have appeared on the market. These elastomeric compositions range from natural rubber to various types of special rubbers which are comparatively costly. In the masterbatching of either cis-polybutadiene or emulsion-polymerized SBR rubber, for example, with high-reinforcing super abrasion furnace blacks, stocks are frequently obtained that are difficult to process and have inferior properties after processing. It would thus be desirable to obtain an elastomeric composition containing cis-polybutadiene and/or emulsion-polymerized SBR rubber having improved finished properties and improved processing properties.

Accordingly, an object of my invention is to provide an improved elastomeric composition.

Another object of my invention is to provide an improved elastomeric composition containing solution-polymerized block butadiene-styrene rubber.

Another object of my invention is to provide an improved elastomeric composition containing solution-polymerized block butadiene-styrene rubber having superior finished properties.

Another object of my invention is to provide a process for the production of an improved elastomeric composition containing solution-polymerized block butadiene-styrene rubber.

Other objects, advantages and features of my invention will be readily apparent to those skilled in the art from the following description and the appended claim.

I have discovered that an improved elastomeric material with superior finished properties results when 5 to 75 weight percent of a block butadiene-styrene rubber prepared by solution polymerization is incorporated in an elastomeric composition as hereinafter defined.

The elastomeric composition of my invention comprises a blend of a block butadiene-styrene rubber made by solution polymerization and at least one rubber selected from the group consisting of polybutadiene rubbers prepared by solution polymerization, emulsion produced polybutadiene rubber, emulsion butadiene-styrene random polymer rubbers, solution-polymerized butadiene-styrene random polymer rubbers, natural rubber and cis-polyisoprene rubber. The butadiene-styrene polymer rubbers include copolymers and terpolymers comprising butadiene-isoprene-styrene. The solution-polymerized polybutadiene rubbers employed in the elastomeric compositions of my invention include cis-polybutadiene produced by any of the known solution polymerization processes that yield predominantly cis-1,4-butadiene polymers. An illustrative process is described in the copending application Ser. No. 754,175 of Naylor et al., filed Aug. 11, 1958 and now U.S. Patent No. 3,205,212. According to that application, 1,3-butadiene is polymerized in the presence of a catalyst consisting of (a) a trialkylaluminum, (b) titanium tetraiodide, and (c) titanium tetrachloride. The cis-polybutadiene as stated therein and applicable to my invention is a rubbery cis-polybutadiene wherein at least 80 percent, and preferably at least 85 percent, of the monomer units in the polymer molecule conform to the cis-1,4 structure (determined according to Silas, Yates and Thornton, Analytical Chemistry, volume 31, pages 529–532, April 1959). The solution polybutadienes in the elastomeric compositions of my invention also include the solution polybutadienes disclosed in British Patent 817,693. According to the British patent, 1,3-butadiene is polymerized in the presence of a diluent and a catalyst consisting of an alkyllithium.

The polybutadiene rubbers produced by emulsion polymerization and employed in the elastomeric compositions of my invention are those polybutadiene rubbers produced by a typical emulsion polymerization process such as described prepared by polymerizing butadiene dispersed in an aqueous medium in the presence of an emulsifying agent at a temperature in the range of 60° to 95° F. while employing sufficient modifier to yield a polymer with an uncompounded Mooney viscosity in the range of 20 to 35.

Emulsion-polymerized SBR rubbers and the solution butadiene-styrene random copolymer rubbers employed in the elastomeric compositions of my invention can be produced by any of the known emulsion and solution polymerization processes employed in the industry. A number of typical recipes that can be employed to produce an emulsion-polymerized butadiene-styrene polymer are presented in ASTM D 1419–61T. As is well known in the art, for example, emulsion-polymerized butadiene-styrene rubber is the butadiene-styrene polymer produced by the emulsion polymerization of butadiene and styrene in the presence of a fatty and/or rosin acid soap at temperatures normally in the range of 40° to 125° F. A process for production of solution-polymerized butadiene-styrene random copolymers is disclosed in U.S. 2,975,160. As therein noted, butadiene and styrene are polymerized in the presence of a hydrocarbon diluent and a polar compound.

Cis-polyisoprene is produced by the polymerization of isoprene. A suitable process, although not to be limited thereto, is disclosed in Industrial and Engineering Chemistry 48, 778 (1956). Therein it is noted that isoprene is polymerized in the presence of a lithium catalyst at a temperature in the range of 30° to 40° C.

The solution-polymerized block butadiene-styrene rubber employed in the elastomeric compositions of my invention can be made by a process such as described in copending application Ser. No. 721,293 by Zelinski, filed Mar. 13, 1958. As provided in the said copending application, a mixture of conjugated diene and vinyl-substituted aromatic monomers, e.g., 1,3-butadiene and styrene, is polymerized in the presence of an organolithium compound such as alkyllithium. Other processes suitable for preparing such block copolymers are described in copending application Ser. No. 796,277 by Zelinski, filed Mar. 2, 1959, now abandoned, and copending application Ser. No. 246,598 by Dollinger, filed Dec. 21, 1962 and now U.S. Patent No. 3,297,793.

Polymerization of the block butadiene-styrene rubber is conducted in the presence of a hydrocarbon diluent, and the resulting block copolymers are composed of two blocks, one being a copolymer of a conjugated diene and styrene and the other being a homopolymer of styrene. The total amount of styrene employed in the preparation of the block copolymer is in the range of 10 to 50 parts by weight per 100 parts by weight total monomers to be polymerized.

The elastomeric compositions of my invention can be prepared (1) by admixing the polymers with mechanical mixers such as roll mills or Banburys, either with or without plasticizers or other processing aids, or (2) by blending solutions of the block butadiene-styrene polymer and at least one solution selected from the group consisting of solutions of solution polybutadienes, emulsion polybutadienes, emulsion butadiene-styrene polymers, solution butadiene-styrene random polymers, natural rubber and cis-polyisoprene.

The resulting elastomeric composition can be compounded and vulcanized by well-known rubber vulcanization recipes. Alternately, each polymer can be compounded separately and the compounded stocks blended to give the desired ratio of block solution-polymerized butadiene-styrene rubber to cis-polybutadiene or emulsion-polymerized butadiene-styrene, for example, in the final blend.

Improved processing qualities of the inventive elastomeric compositions are illustrated by a decreased Mooney, an increased scorch time, lower final Banbury mix temperatures, and a reduced mill shrinkage in the compounded elastomeric composition. A reduced mill shrinkage is indicative of improved extrusion characteristics and smooth calendering stock. Improved finished properties of stocks produced from the inventive elastomeric compositions are evidenced by, for example, improved abrasion ratings obtained from passenger-tire retreads prepared utilizing the inventive elastomeric compositions. A blend of a solution-polymerized block butadiene-styrene rubber and an emulsion butadiene-styrene polymer produces a rubber that when employed for shoe soles and the like improves wear and molding properties.

The following examples are presented as illustrative of the improved processability and properties of the elastomeric compositions of my invention. However, it is not intended that the invention should be limited to the embodiments presented therein.

*Example I*

A block solution-polymerized butadiene-styrene rubber was prepared using the following recipe:

| | Parts by weight |
|---|---|
| 1,3-butadiene | 75 |
| Styrene | 25 |
| n-Hexane | 900 |
| n-Butyllithium | 0.187 |

The reaction was initiated at a temperature of 160° F. by adding the n-butyllithium to the solution of monomers in n-hexane. A peak temperature of about 250° F. was reached in 10 to 15 minutes, and the reaction was continued for an additional 50 to 60 minutes. At that time 0.75 part of fatty acid was added as shortstop and 1.0 part of 2,6-di-tert-butyl-4-methylphenol was added as antioxidant. The polymer was recovered by steam-stripping and dried. The product contained 24.9 weight percent total styrene as determined by ultraviolet analysis and 16.9 weight percent block styrene as determined by oxidative degradation analysis.

This analysis is based on the principle that polymer molecules containing ethylenic bonds and dissolved in p-dichlorobenzene and toluene can be broken into fragments by reaction with tert-butyl hydroperoxide catalyzed with osmium tetraoxide. Saturated polymer molecules or molecular segments such as polystyrene or the polystyrene units in block copolymers containing no ethylenic bonds remain unattacked. The small fragments (low molecular weight aldehydes) and the low molecular weight polystyrene fragments from the copolymer block are soluble in ethanol whereas the unattacked high molecular weight polystyrene from the styrene homopolymer blocks is insoluble in ethanol. It is thus possible to effect the separation of a high molecular weight polystyrene which constitutes the homopolymer blocks of the block copolymer.

Approximately 0.5 gram of the polymer prepared as described above was cut into small pieces, weighed and charged to a 125-ml. flask. 45 grams of p-dichlorobenzene was then charged to the flask and the flask was heated to 130° C. The flask was maintained at this temperature until the polymer present had become dissolved. The solution was then cooled to 85° C., and 8.4 ml. of the 71.3 percent by weight aqueous solution of tert-butyl hydroperoxide was added to the solution. One ml. of 0.003 molar osmium tetraoxide in toluene was then charged to the flask contents and the resulting solution heated to 115° C. for ten minutes. The solution was then cooled to 55° C. 20 ml. of toluene was then added and the solution was poured slowly into 250 ml. of ethanol containing a few drops of concentrated sulfuric acid. Polystyrene coagulated out of solution. The polymer was recovered and dried. The weight percent of polystyrene recovered is a measure of the amount of styrene contained in the homopolymer block.

A Type 1609 SBR (emulsion polymerized butadiene-styrene rubber) rubber was prepared according to the recipe provided in ASTM D 1419–61T. The SBR rubber and the block solution-polymerized butadiene-styrene rubber were blended and compounded in the following recipes presented in Table I.

TABLE I

| | Parts by Weight | | | |
|---|---|---|---|---|
| | Run 1 | Run 2 | Run 3 | Run 4 |
| SBR Copolymer | 100 | 90 | 80 | 70 |
| Block Copolymer | 0 | 10 | 20 | 30 |
| Carbon Black | 40 | 40 | 40 | 40 |
| Aromatic Oil | 7.5 | 8.5 | 10 | 11.5 |
| Zinc Oxide | 3 | 3 | 3 | 3 |
| Stearic Acid | 2 | 2 | 2 | 2 |
| BLE 25 [a] | 1 | 1 | 1 | 1 |
| Santoflex AW [b] | 1.5 | 1.5 | 1.5 | 1.5 |
| Sulfur | 1.75 | 1.75 | 1.75 | 1.75 |
| Santocure [c] | 1.10 | 1.10 | 1.10 | 1.10 |

See Table II for footnotes.

The processing data obtained for the respective runs of Table I are illustrated below in Table II.

TABLE II

| | Run 1 | Run 2 | Run 3 | Run 4 |
|---|---|---|---|---|
| Compounded ML-4, 212° F. [d] | 52 | 45 | 43 | 40 |
| Scorch at 280° F., min. [e] | 19.2 | 20.0 | 20.4 | 22.8 |
| Mill shrinkage, percent [f] | 40.3 | 38.7 | 37.7 | 31.7 |
| Final mix temp., °F | 275 | 275 | 260 | 252 |

[a] High-temperature reaction product of diphenylamine and acetone.
[b] 6-ethoxy-1,2-dihydro-2,2,4-trimethylquinoline.
[c] N-cyclohexyl-2-benzothiazole sulfenamide.
[d] ASTM D 1646–61, Mooney Viscometer, large rotor, 4 minutes.
[e] ASTM D 1641–61, Mooney Viscometer, large rotor. Scorch is time in minutes to 5-point rise above minimum Mooney.
[f] Percentage decrease in length during a 2-hour exposure at 212° F. of a milled specimen 0.75 inch wide and 18.85 inches long peeled from the front roll of a 6-inch mill.

The desirable qualities of the block copolymer as a processing aid are indicated by the decreased Mooney, increased scorch time, and lower final Banbury mix temperatures of the inventive elastomeric compositions. The reduced mill shrinkage is indicative of improved extrusion characteristics and smooth calendering stock.

*Example II*

A block solution-polymerized butadiene-styrene rubber was prepared in the same manner as in Example I, and a Type 1503 SBR (emulsion-polymerized) rubber was prepared according to the recipe provided in ASTM D 1419–61T. These two rubbers were blended and compounded in the following recipes illustrated in Table III.

TABLE III

| | Parts by Weight | | | | | | |
|---|---|---|---|---|---|---|---|
| | Run 5 | Run 6 | Run 7 | Run 8 | Run 9 | Run 10 | Run 11 |
| SBR Copolymer | 100 | 95 | 90 | 85 | 75 | 50 | 0 |
| Block Copolymer | 0 | 5 | 10 | 15 | 25 | 50 | 100 |
| Clay | 100 | 100 | 100 | 100 | 100 | 100 | 100 |
| Zinc Oxide | 10 | 10 | 10 | 10 | 10 | 10 | 10 |
| Calcium Carbonate | 50 | 50 | 50 | 50 | 50 | 50 | 50 |
| Cumar MH-2½ [a] | 15 | 15 | 15 | 15 | 15 | 15 | 15 |
| Stearic Acid | 2 | 2 | 2 | 2 | 2 | 2 | 2 |
| Agerite Stalite [b] | 1.5 | 1.5 | 1.5 | 1.5 | 1.5 | 1.5 | 1.5 |
| Sulfur | 2 | 2 | 2 | 2 | 2 | 2 | 2 |
| Altax [c] | 1.25 | 1.25 | 1.25 | 1.25 | 1.25 | 1.25 | 1.25 |
| Methyl Zimate [d] | 0.5 | 0.5 | 0.5 | 0.5 | 0.5 | 0.5 | 0.5 |

See Table IV for footnotes.

These blends, which were prepared for insulation stocks, showed the same desirable processing characteristics as the blends of Example I as well as demonstrating the following desirable and unexpected tensile strength and elongation:

TABLE IV

| | 30 Minute Cure at 307° F. | | | | | | |
|---|---|---|---|---|---|---|---|
| | Run 5 | Run 6 | Run 7 | Run 8 | Run 9 | Run 10 | Run 11 |
| Tensile, p.s.i.[e] | 1,490 | 1,340 | 1,480 | 1,410 | 1,490 | 1,440 | 900 |
| Elongation, percent [e] | 840 | 810 | 830 | 820 | 840 | 820 | 405 |
| | Oven Aged 24 Hours at 212° F. | | | | | | |
| Tensile, p.s.i.[e] | 1,330 | 1,460 | 1,610 | 1,325 | 1,560 | 1,450 | 1,280 |
| Elongation, percent [e] | 650 | 670 | 660 | 615 | 645 | 600 | 450 |

[a] Cumarone-indene resin.
[b] Mixture of mono- and dioctyl diphenylamines.
[c] 2,2′-dibenzothiazyl disulfide.
[d] Zinc dimethyldithiocarbamate.
[e] ASTM D 412-61T. Scott Tensile Machine. 80° F.

The tensile strength and elongation of both the cured and oven-aged blends are considerably higher than would be expected from the same properties of the parent copolymers.

*Example III*

A block solution-polymerized butadiene-styrene rubber having an ML-4 at 212° F. of 120 was prepared in the same manner as in Example I.

A polybutadiene rubber having an ML-4 at 212° F. of 45 and a cis-polybutadiene content of about 87 percent was prepared according to the following recipe:

| | Parts by weight |
|---|---|
| 1,3-butadiene | 100 |
| Toluene | 1200 |
| Triisobutylaluminum | 0.50 |
| Titanium tetraiodide | 0.14 |
| Titanium tetrachloride | 0.048 |

The reaction was initiated at a temperature of 15° F. and controlled thereafter at 40° F. At the end of the three-hour reaction period, conversion was about 88 percent. The reaction was shortstopped with 2 parts per 100 parts of rubber (p.h.r.) of a disproportionated pale rosin stable to heat and light, and 0.5 p.h.r. of 2,2′-methylene-bis(4-methyl-6-tert-butylphenol) was added as antioxidant. The polymer was then steam stripped for solvent removal, and the crumb was washed with water and dried.

A Type 1712 SBR rubber was prepared according to the recipe given in ASTM D 1419–61T. Tire-treadstocks were prepared from these three rubbers employing the following recipes:

TABLE V

| | Parts by Weight | | | |
|---|---|---|---|---|
| | Run 12 | Run 13 | Run 14 | Run 15 |
| Cis-polybutadiene | 50 | 50 | 100 | 0 |
| Block Copolymer | 50 | 0 | 0 | 0 |
| SBR 1712 | 0 | 68.75 | 0 | 137.5 |
| Carbon Black | [a] 68 | [a] 68 | [b] 85 | [a] 68 |
| Aromatic Oil | 40 | 20.75 | 40 | 2 |
| Zinc Oxide | 3 | 3 | 3 | 3 |
| Stearic Acid | 2 | 2 | 2 | 2 |
| Santoflex AW [c] | 0 | 3 | | 0 |
| Wingstay 100 [d] | 1 | 1 | | 1 |
| BLE 25 [e] | 3 | 0 | | 3 |
| Flexamine [f] | 0 | 0 | 1 | 0 |
| Resin 731D [g] | 0 | 0 | 5 | 0 |
| Paraffin Wax | 3 | 3 | 0 | 3 |
| Sulfur | 2 | 2 | 2.25 | 2 |
| NOBS Special [h] | 1.2 | 1.2 | 1.4 | 0 |
| Santocure [i] | 0 | 0 | 0 | 1.2 |

[a] Intermediate super-abrasion furnace black.
[b] High-abrasion furnace black.
[c] 6-ethoxy-1,2-dihydro-2,2,4-trimethylquinoline.
[d] Diaryl-p-phenylenediamine.
[e] High-temperature reaction product of diphenylamine and acetone.
[f] A physical mixture of a complex diarylamine-ketone reaction product (65%) and N,N′-diphenyl-p-phenylenediamine (35%).
[g] A disproportionated pale rosin stable to heat and light.
[h] N-oxydiethylene-2-benzothiazyl sulfenamide.
[i] N-cyclohexyl-2-benzothiazole sulfenamide.

Four 8.50 x 14 passenger-tire retreads prepared from each of the stocks of Runs 12, 13, 14 and 15 were road tested for 12,000 miles under the following conditions:

Loads per tire _____ lbs. __ 1190
Speed _____ m.p.h. __ 60
Inflation _____ p.s.i.g. __ 26

Abrasion ratings were determined at 12,000 miles by measuring the average residual depth of tread and calculating the tread worn off during the test. The following results were obtained:

Stock: Abrasion rating
   Cis-polybutadiene/block copolymer
    (Run 12) _____ 207
   Cis-polybutadiene/SBR 1712 (Run 13) _____ 115
   Cis-polybutadiene (Run 14) _____ 134
   SBR 1712 (Run 15) _____ 100

The above data clearly illustrate that the road performance of cis-polybutadiene rubber is improved from a relative rating of 134 to a relative rating of 207 by blending with block solution-polymerized butadiene-styrene rubber, whereas it is decreased to a relative rating of 115 by blending with SBR 1712.

Various modifications of this invention can be made, or followed, in view of the foregoing, without departing from the spirit or scope thereof.

I claim:

An elastomeric composition comprising (A) a block butadiene-styrene copolymer produced by copolymerization of butadiene and styrene in the presence of a hydrocarbon diluent and an organolithium catalyst, said block copolymer being composed of two blocks, one being a copolymer of a butadiene and styrene and the other being a homopolymer of styrene, the total amount of styrene employed in the preparation of the copolymer being in the range of 10 to 50 parts by weight per 100 parts by weight total monomers to be polymerized and (B) a solution polymerized polybutadiene rubber in which at least 80 percent of the monomer units in the polymer conform to the cis-1,4 structure, the concentration of said block butadiene-styrene copolymer being in the range of 10 to 50 weight percent of said elastomeric composition.

References Cited

UNITED STATES PATENTS

| | | | |
|---|---|---|---|
| 2,688,605 | 9/1954 | Tucker | 260—894 XR |
| 3,030,346 | 4/1962 | Cooper | 260—880 XR |
| 3,060,989 | 10/1962 | Railsback et al. | 260—5 |
| 3,157,218 | 11/1964 | Brown | 260—894 XR |
| 3,238,173 | 3/1966 | Bailey et al. | 260—876 |
| 3,251,905 | 5/1966 | Zelinski | 260—879 |
| 3,265,765 | 8/1966 | Holden et al. | 260—876 |

FOREIGN PATENTS

| | | |
|---|---|---|
| 80,692 | 4/1963 | France. |
| 852,823 | 11/1960 | Great Britain. |
| 884,974 | 12/1961 | Great Britain. |

GEORGE F. LESMES, *Primary Examiner.*

MURRAY TILLMAN, *Examiner.*